Dec. 18, 1962  V. K. CHARVAT  3,068,758
EXTRUSION REMOVAL TOOL

Filed May 6, 1959  2 Sheets-Sheet 1

INVENTOR.
VERNON K. CHARVAT
BY
Oberlin, Maky & Donnelly
ATTORNEYS

Dec. 18, 1962 V. K. CHARVAT 3,068,758
EXTRUSION REMOVAL TOOL
Filed May 6, 1959 2 Sheets-Sheet 2
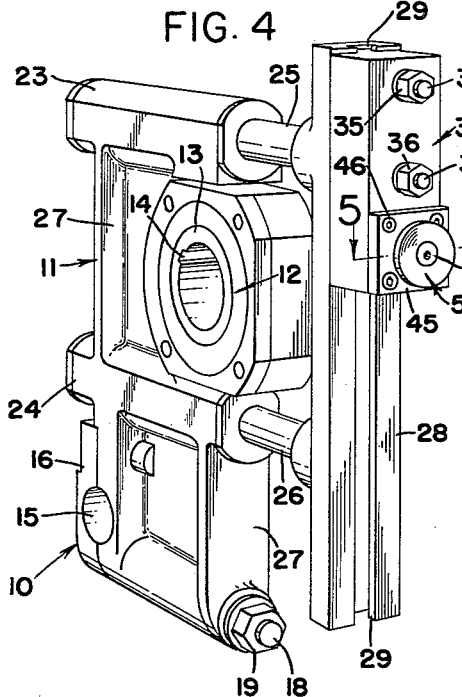
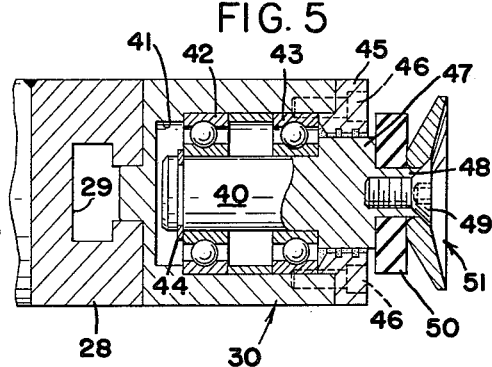
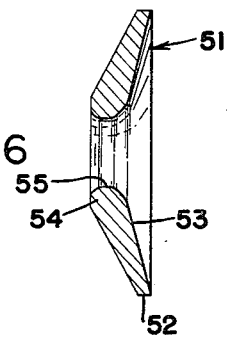
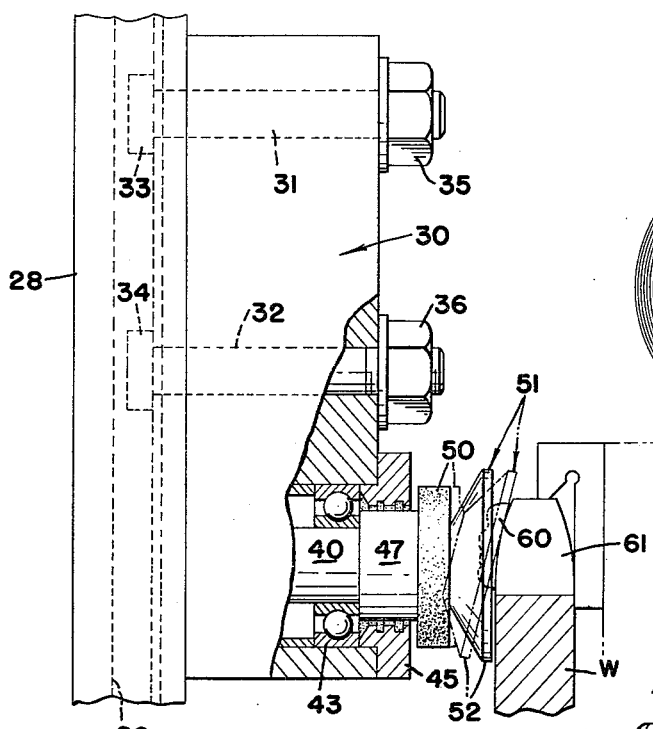
INVENTOR.
VERNON K. CHARVAT
BY
Oberlin, Maky & Donnelly
ATTORNEYS United States Patent Office 3,068,758
Patented Dec. 18, 1962

3,068,758
EXTRUSION REMOVAL TOOL
Vernon K. Charvat, Bay Village, Ohio, assignor to The Osborn Manufacturing Company, Cleveland, Ohio, a corporation of Ohio
Filed May 6, 1959, Ser. No. 811,330
16 Claims. (Cl. 90—1.4)

This invention relates generally as indicated to an extrusion removal tool and more particularly to a cutting or skiving tool adapted to assist in the finishing of parts which have burrs of a size which are too large to be efficiently removed by rotary finishing tools, as for example, brushes or abrading wheels.

In forming parts such as gears, for example, the hobbing or cutting machine in passing through the work often leaves extremely large burrs or extrusions on the outfeed side which cannot effectively be removed by a subsequent finishing operation with brushes or other rotary finishing tools. The extrusions generally result from a too high operating or cutting speed by the cutting tools. In order to have the blank or part of such condition that a proper finishing operation may effectively be performed thereon, it is necessary to run the hobbing or cutting operation at a much slower rate of speed. These large burrs or extrusions can, however, be removed if an extremely long finishing operation is applied thereto. However, such finishing generally is not completely satisfactory and moreover, the length of time involved lowers the output of any brushing lathe or finishing machine and thus raises the cost of the part produced. Moreover, the brushing or finishing tools employed must be replaced more often, further raising the cost of the finished article. The life of the brush as measured by the number of parts finished per brush is extremely short in that it is proportional to the length of time in driven contact with the part being finished. This is true, of course, of any rotary finishing tool.

Consequently, a device that will effectively remove these large extrusions or burrs resulting from the cutting or forming operation on the blank will thus greatly facilitate the final finishing of the product involved.

It is accordingly a principal object of my invention to provide a cutting tool effectively and quickly to remove the burrs or extrusions resulting from a prior cutting operation.

It is a further principal object of my invention to provide a machine capable of satisfactorily finishing parts which have burrs and extrusions thereon of a size which are too large effectively to be removed with conventional rotary finishing tools alone.

It is another object of my invention to provide an accessory for a brushing lathe or finishing machine which may readily and easily be installed thereon to assist such machine in the finishing of parts resulting in a longer finishing tool life and a lower cost per part.

It is a further object of my invention to provide a unique tool for removing large burrs and extrusions from the end faces of generally cylindrical parts.

It is yet another object of my invention to provide a tool adapted to be used with a finishing tool or wheel for parts having burrs or extrusions thereon which tool will adapt itself to variations in the finishing tool size as the result of wear of the finishing tool.

It is still another object of my invention to provide a pivotal resilient mounting for a tool that will permit such tool readily to remove burrs or extrusions from inclined or curved work surfaces.

It is a still further object of my invention to provide a finishing device for gears and the like that will permit such gears and the like to be hobbed or cut at higher speeds.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but a few of the various ways in which the principles of the invention may be employed.

In said annexed drawings:

FIG. 4 is a perspective view of my extrusion removal tool as removed from the brushing lathe;

FIG. 5 is a fragmentary sectional view taken substantially on the line 5—5 of FIG. 4;

FIG. 6 is a vertical section of my circular skiving tool employed with my invention;

FIG. 7 is a plan view of the circular skiving tool as seen from the right in FIG. 6; and FIG. 8 is a fragmentary view of my extrusion removal tool illustrating the manner in which the skiving tool conforms to the workpiece face.

Figure 1:
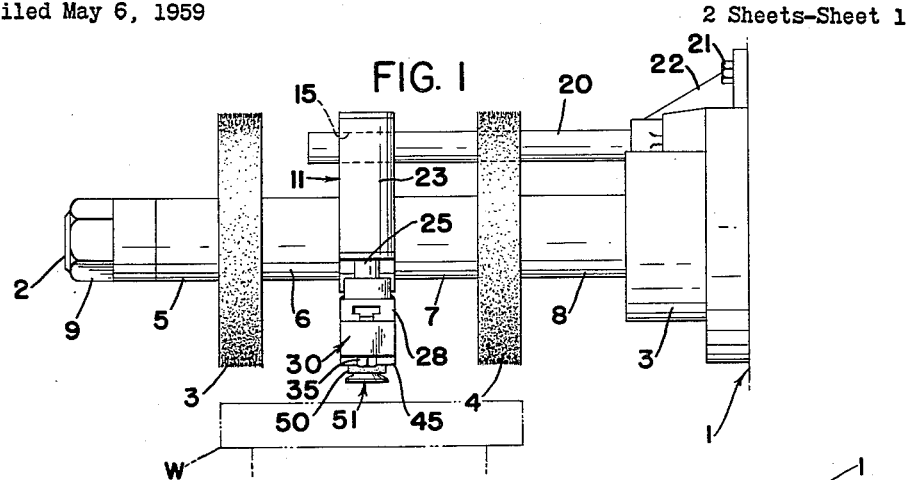
FIG. 1 is a top plan view illustrating an extrusion removal tool built in accordance with my invention mounted on a generally typical brushing lathe.
Figure 2:
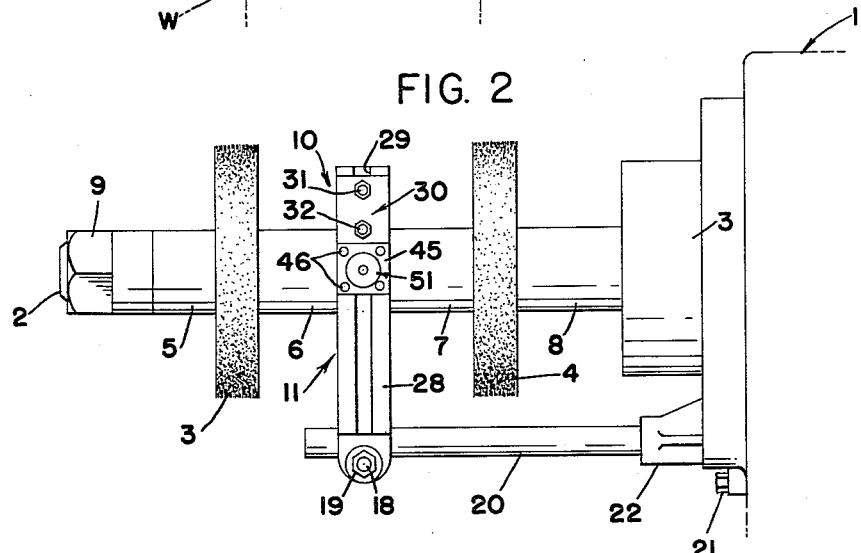
FIG. 2 is a front elevation of the lathe of FIG. 1.
Figure 3:
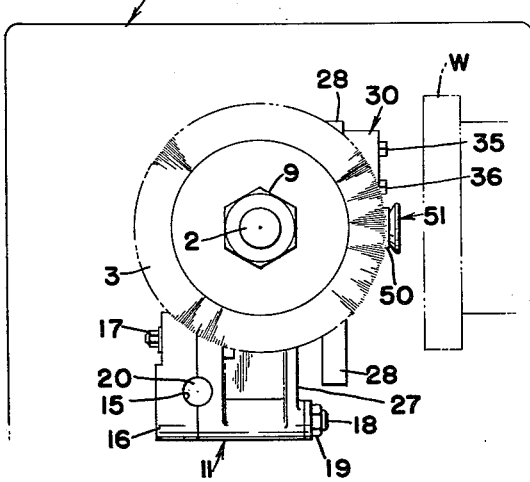
FIG. 3 is an end elevation of the lathe of FIGS. 1 and 2 as seen from the left thereof.

Referring now to FIGS. 1 through 3 of the drawings, I illustrate a generally conventional brushing lathe which comprises a body or base 1 in which is mounted the means to drive the brush arbor or shaft 2 at any desired speed. The arbor or shaft is enclosed within a suitable bearing collar 3 firmly to support the shaft against lateral vibrations. Axially mounted in spaced relation on the arbor 2 are two conventional brushes 3 and 4 which may be of a suitable wire bristle construction adapted to finish or deburr gears or other unfinished parts. An example of such brushes may be seen in the patent to Peterson, 2,826,776.

The brushes are mounted on the arbor 2 by means of collars 5, 6, 7 and 8 suitably clamped together by a nut 9 threaded on the end thereof. In this manner, by using collars of different axial length, the spacing of the brushes along the arbor may readily be varied so that the work faces of the brushes 3 and 4 will contact the peripheral portions of a workpiece of any diameter. It will be understood that a brushing lathe employing thereon two rotating axially spaced finishing tools is generally conventional and reference may be had to the patent to Nelson et al. No. 2,682,065 for a disclosure of such brushing lathe.

In the illustrated embodiment, my extrusion removal tool is generally shown at 10 and is spaced between collars 6 and 7 on the arbor 2 in such a manner that it will be an equal axial distance from each of the brushes 3 and 4.

Referring now to FIG. 4, it will be seen that my extrusion removal tool generally comprises a base or frame 11 of suitable construction, as for example, welded or cast steel. Centrally of the frame, I provide a bearing generally shown at 12 to enclose the arbor 2. The inner or rotating portion of the bearing 13 is illustrated as having a key-way 14 therein whereby it may be keyed upon the arbor 2. The bearing itself may preferably be a ball bearing of conventional construction thus to permit the arbor to rotate freely with my extrusion removal tool mounted thereon. In order to preclude the entire tool 10 from rotating with the shaft or arbor 2, I provide another axially spaced aperture in my base 11 generally shown at 15. This aperture 15 is formed by two mating semi-circular openings, one being formed in the base itself and the other being formed in a clamping plate 16. The clamping plate is secured at its upper end to the base 11 by suitable fastening means as for example, bolt 17. At the lower end of the clamping plate there is a threaded aperture having secured therein an elongated bolt 18 which extends through an elongated enlarged opening in the base 11 and has mounted thereon an adjusting nut 19.

Referring to FIGS. 1 through 3, it will be seen that the opening 15 is adapted to enclose a locking shaft 20 which is mounted on the base of the brushing lathe to extend parallel to the brushing arbor 2. By manipulating the nut 19, the pressure of the clamping plate on the locking shaft 20 can adjustably be controlled. The locking shaft is mounted on the lathe base by suitable mounting bolts 21 to extend parallel to the brushing arbor and, if desired, jack screws may be utilized to adjust the locking shaft to position and maintain it perfectly parallel to the arbor 2. A suitable ribbed supporting frame 22 may be utilized to support the shaft 20 in its extended parallel position.

It can now be seen that my extrusion removal tool can be assembled on the arbor 2 in the same manner that the brush or finishing tool is assembled thereon. Moreover, the position of the extrusion removal tool longitudinally of the arbor 2 is adjustable since the bearing portion 13 will slide on the arbor and the clamping plate 16 may be loosened by means of the adjusting nut 19. In this manner, the tool may be removed simply by removing the nut 9, the collar 5, the brush 3 and the collar 6.

The base 11 is formed with two elongated generally cylindrical housings 23 and 24, above and below, respectively, the bearing 12. The housings 23 and 24 contain resilient pressure means as, for example, air or coil springs resiliently to force outwardly rods 25 and 26. Suitable stops will, of course, be employed to control or limit the stroke of the rods 25 and 26. The outer portions of the rods may be covered by suitable boots or dust covers in a conventional manner. As shown in FIG. 4, reinforcing ribs 27 are employed between the housing 23, 24 and the lower portion of the base to provide a more rigid structure.

On the outer ends of the rods 25 and 26, I mount an elongated vertical guide-way 28 of a configuration more clearly seen in FIG. 5. A T-slot 29 extends the entire vertical length thereof with the opening facing outwardly. As more clearly seen in FIGS. 5 and 8, I slidably mount on such guide-way 28 a bearing block 30 by means of spaced T-bolts 31 and 32, the heads 33 and 34 of which are secured within the guide-way 29. Nuts 35 and 36 may be employed to adjust the pressure of the bolt heads 33 and 34 within the slot 29 and thus to render the block 30 adjustably positionable along the guide-way 28. As shown in FIGS. 4 and 5, I mount a shaft 40 within the lower end of my bearing block 30 in a cavity 41. Spaced ball bearings 42 and 43 are employed to rotatably mount the shaft 40 within the bearing block 30. A suitable lock ring 44 may be employed to maintain the shaft within the cavity. A removable plate 45 is employed with recessed head screws 46 to provide access to the bearing structure. The bearings 42 and 43 are generally force-fitted within the cavity 41 thus to provide a rigid firm rotatable mounting for the shaft 40. The bearings 42 and 43 are spaced as far apart as practically possible to provide the best possible support for the shaft 40. The outer end of the shaft is provided with an annular shoulder 47 retaining the bearing 43 and includes a reduced annular extension 48. The interior of this annular extension is suitably threaded and counter-sunk or beveled to accommodate a frusto-conically headed screw 49, the reduced annular extension 48 of shaft 40 thus terminating in a removable frusto-conical head.

Secured between the anular shoulder 47 of the shaft 40 and the frusto-conical head of the screw 49, I place a resiliently deformable annulus or washer 50 and my disc-shape skiving tool 51. The annular ring 50 may be made of any suitable resiliently deformable material, I, however, preferring Neoprene. The annular extension of the shaft 48 thus has a frusto-conical retaining head 49 thereon when the screw is firmly secured in place.

Referring now to FIGS. 6 and 7, there is illustrated the configuration of my disc-shape skiving tool. The tool generally comprises a disc having a peripheral cutting edge 52, which in the illustrated embodiment is shown as being formed as a right circular cylindrical surface. The faces of the disc are outwardly flaring toward such cutting edge, the under portion thereof being dished or relieved as shown at 53. The central portion of the tool terminates inwardly in an annular thickened toroidal portion 54 having rounded edge portions forming a central aperture 55 therethrough. It will be understood that although a right circular cylindrical cutting edge 52 is illustrated, this edge may be inclined at any desired angle for the proper cutting or shearing action.

The disc-shape skiving tool 51 is mounted on the extension 48 of the shaft 40 and is retained thereon with the frusto-conical head 49 closely conforming to the rounded toroidal portion thereof. It is noted that the inner diameter in the aperture 55 through the center of the tool is slightly larger than the diameter of the extension 48 of shaft 40. In this manner, the disc-shape tool 51 is mounted for pivotal axial movement upon the extension 48. The resiliently deformable washer will maintain the tool 51 generally normal to its axis of rotation when no working loads are placed thereon.

Referring now to FIGS. 1 through 3 and 8, it will be seen that a workpiece W may be either externally or internally chucked on a rotatable shaft, as for example, by a mechanism shown in the aforesaid Nelson patent, to be presented to the work faces of the finishing tools or brushes 3 and 4. The workpiece W to be finished is illustrated, as for example, as a gear having burrs or extrusions 60 thereon which generally are formed on the out-feed side by the cutting or hobbing tools. As aforesaid, when these tools are operated at too fast a speed, the extrusions are such that they generally cannot effectively be removed by finishing tools such as the brushes 3 and 4. If they are to be effectively removed, it would, of course, require a much longer cycle of operation with the face of the tool being kept constantly in contact with the rotating workpiece. It will be seen that with my brushing lathe accessory mounted on the arbor 2, that the cutting or skiving tool 51 may adjustably be positioned so that the peripheral cutting edge 52 will contact the burrs or extrusions 60 on the workpiece as the workpiece is rotated and moved into contact with the working faces of the finishing tools 3 and 4.

The extrusion removal tool is generally mounted to extend slightly beyond the work faces of the brushes 3 and 4 thus first to contact the workpiece as it is moved toward the brushing lathe. The resilient pressure on the rods 25 and 26 will maintain the tool against the face of the work W. As the burrs 60 contact the cutting edge of the skiving tool, the tool will tend to rotate and in this manner effecting a shearing action to sever or remove the large extrusions or burrs from the face of the gear. Since the tool is permitted to rotate, it will have a self-sharpening feature and need not frequently be reground. The tool is, of course, formed of a hardened tool steel and need only infrequently be replaced. It can now be seen that if the angle of the cutting edge 52 is sloped outwardly away from the workpiece, the tool will have a tendency to move toward the work whereas if it is sloped slightly inwardly, the tool will have a tendency to move away from the work. Accordingly, the angle of the cutting edge may be varied depending upon the cutting action desired.

As can be seen in FIG. 8, the unique resilient mounting of my cutting tool permits the circular skiving or cutting tool to conform to the sloping sides of the gear tooth 61 thus more adequately to finish the work. Not only is the tool resiliently pivotally mounted on its own axis of rotation but since the entire guide-way 28 is resiliently mounted on the base 11, the pressure of the tool against the work will readily adapt it to extreme variations in the size and configuration of the extrusions or burrs. Moreover, the resilient mounting of the guide-way 28 permits the tool to adjust to various work positions as the finishing tool wears away. Thus, the diameter of the finishing tool may decrease by as much as 2 inches for example, and the position of the skiving tool 51 need not be readjusted. Of course, the pressure on the rods 25 and 26 may be adjusted for the various work conditions encountered. If desired, stops may be provided to limit the stroke of the rods.

The tool illustrated in FIGS. 6 and 7 is dished or relieved to accommodate the frusto-conical head 49 on the end of the shaft 40 to permit the pivotal movement of the disc without the head 49 contacting the work. It is noted that the screw with the frusto-conical head thereon is a means removably to attach the tool 51 and the washer 50 to the end or extension 48 of the shaft 40.

It can now be seen that my extrusion removal tool may readily be assembled as an accessory on any conventional brush or finishing lathe readily to assist in the finishing of parts having large extrusions or burrs thereon. Moreover, the cutter is adjustable longitudinally of the arbor 2, resiliently adjustable toward and away from the work and vertically adjustable along the guide 28. In this manner, it will be seen that the cutter can accommodate practically any size or shape of workpiece. Further, it is possible to employ two bearing blocks 30 on the guide 28 to work on opposite portions on the face of the workpiece. By inverting the cutter block, it is possible to space two cutters either at the extreme ends of the guide or practically adjacent each other depending upon the size of the workpiece. It will, of course, be understood that the tool itself may come in various sizes for different finishing operations.

By using my extrusion removal or rough finishing tool as an accessory for a brushing or finishing lathe, simultaneously to operate on a workpiece with other finishing tools, I have found it is possible to reduce the cycle time for each part finished by as much as 50 percent. The part is in this manner subjected to a simultaneous roughening and finishing operation. Consequently, as will be readily seen, a much longer brush life can be expected as measured by the number of parts finished per brush. It will, of course, be understood that any finishing tool may be employed as, for example, a grinding wheel, but that the replacement thereof as the result of wear will be generally proportional to that of a brush. In this manner, the machine load can be increased which, of course, results in a lower cost for the product finished and in one case, it has been possible to reduce the finishing operation from 45 seconds using brushes alone, which produced only partially satisfactory results, to 6 seconds. Thus, it can be seen that the leveling of the size of the burrs to a given and constant condition will permit the obtaining of more uniform results. One of the primary advantages of this tool is that it permits the parts to be cut at a much higher speed in that it will effectively remove the burrs or extrusions resulting from this high speed cutting or hobbing operation. Previously, in order properly to finish the part, it has been required that a much slower cutting speed be employed. This, together with the decrease in finishing time, will result in a much faster and hence cheaper production of the finished article. By applying my tool to the root portions of the gear teeth, the heavier extrusions can be removed, whereas the brushes alone can generally remove the burrs from the chamfered portion of the teeth.

Moreover, the easy assembly of my extrusion removal tool upon the brush shaft or arbor reduces the down-time of the machine involved when adjusting the position thereof to accommodate various sizes of parts. Moreover, the cutter 51 can easily be removed by the screw 49 to be replaced when worn.

It can now be seen that I have provided a unique cutting or rough finishing tool which will quickly and effectively remove large extrusions resulting from a prior high speed cutting operation. Further, I have provided a unique skiving tool which will conform to inclined or curved work surfaces in a manner effectively to remove large burrs or extrusions to assist in the proper finishing of machined parts.

Other modes of applying the principle of the invention may be employed, change being made as regards the details described, provided the features stated in any of the following claims or the equivalent of such be employed.

I, therefore, particularly point out and distinctly claim as my invention:

1. A tool comprising a dish-shape disc having an outer peripheral circular cutting edge and terminating inwardly in a central aperture, said tool being thicker adjacent the aperture than adjacent the cutting edge, the inner edge portions of said tool surrounding said aperture being rounded to facilitate axial pivotal movement.

2. A tool comprising a disc-shape cutter having a central aperture therethrough, means mounting said cutter on a shaft extending through said aperture, said means including a resilient backup for mounting said cutter for resilient pivotal movement with respect to said shaft, and means mounting said tool for vertical adjustment.

3. An accessory for a machine for finishing gears and the like having a driven arbor and finishing tools mounted on such arbor adapted to finish a workpiece presented thereto; said accessory comprising a skiving tool, mounting means for said skiving tool whereby the position of said tool may be vertically and horizontally adjusted to position said tool against the workpiece face, said mounting means including a base rotatably enclosing said arbor, and a locking shaft extending parallel thereto whereby said base will be held against rotation.

4. An accessory as set forth in claim 3 including a vertically extending guide-way resiliently mounted on said base.

5. An accessory as set forth in claim 4 wherein said disc-shape skiving tool is freely rotatably mounted in a bearing vertically adjustably secured to said vertically extending guide-way.

6. An accessory as set forth in claim 5 wherein said disc-shape skiving tool is resiliently pivotally mounted on said bearing block whereby said tool will conform to irregular work surfaces.

7. A circular dish-shape skiving tool comprising a rotatable disc having a peripheral cutting edge, said tool terminating inwardly in an annular thickened toroidal portion forming a central aperture therethrough having rounded edge portions, a bearing shaft extending through such aperture terminating in a frusto-conical head, and means resiliently to hold said tool against said frusto-conical head.

8. A tool as set forth in claim 7 wherein said head is positioned on the dished side of said tool.

9. A tool as set forth in claim 8 wherein said bearing shaft has a diameter slightly smaller than the diameter of such aperture.

10. A tool as set forth in claim 9 wherein said means comprises a resiliently deformable annulus bearing against said tool around such aperture.

11. A tool as set forth in claim 7 wherein said tool is horizontally and vertically adjustable with respect to a workpiece.

12. In combination a pair of rotary brushes mounted in spaced relation on an arbor shaft bearing against and finishing a workpiece, a cutting tool interposed between said brushes, said tool being mounted on said shaft resiliently to bear against such work-face, and means mounting said tool for resilient pivotal movement whereby the tool will conform to irregular work-faces.

13. The combination set forth in claim 12 wherein said cutting tool is dish-shape and has an outer peripheral portion forming a circular cutting edge, said cutting tool terminating inwardly in an annular thickened toroidal portion forming a central aperture therethrough.

14. The combination set forth in claim 13 wherein said cutting tool is freely rotatably mounted on a shaft extending through such aperture, said shaft terminating in a frusto-conical head.

15. The combination set forth in claim 14 including a resiliently deformable back-up washer mounted on said shaft to resiliently pivotally hold said cutting tool against such work-face.

16. A finishing machine for gears and the like comprising a rotary finishing tool adapted to bear against and finish the tooth portions of such gears on one face thereof, a cutting tool adapted to bear against the peripheral portion of such gears on the same face thereof simultaneously to remove burrs and extrusions from such gears that are too large to be removed by said finishing tool, a base for said cutting tool, a locking shaft, and means mounting said base and thus said cutting tool on said locking shaft for adjustment with respect to said one face of such gears.

References Cited in the file of this patent

UNITED STATES PATENTS

| | | |
|---|---|---|
| Re. 20,856 | Graham | Sept. 13, 1938 |
| 1,928,770 | Uhlmann et al. | Oct. 3, 1933 |
| 2,682,065 | Nelson et al. | June 29, 1954 |
| 2,787,195 | Topolinski | Apr. 2, 1957 |
| 2,921,504 | Glingener | Jan. 19, 1960 |